Figure 1:
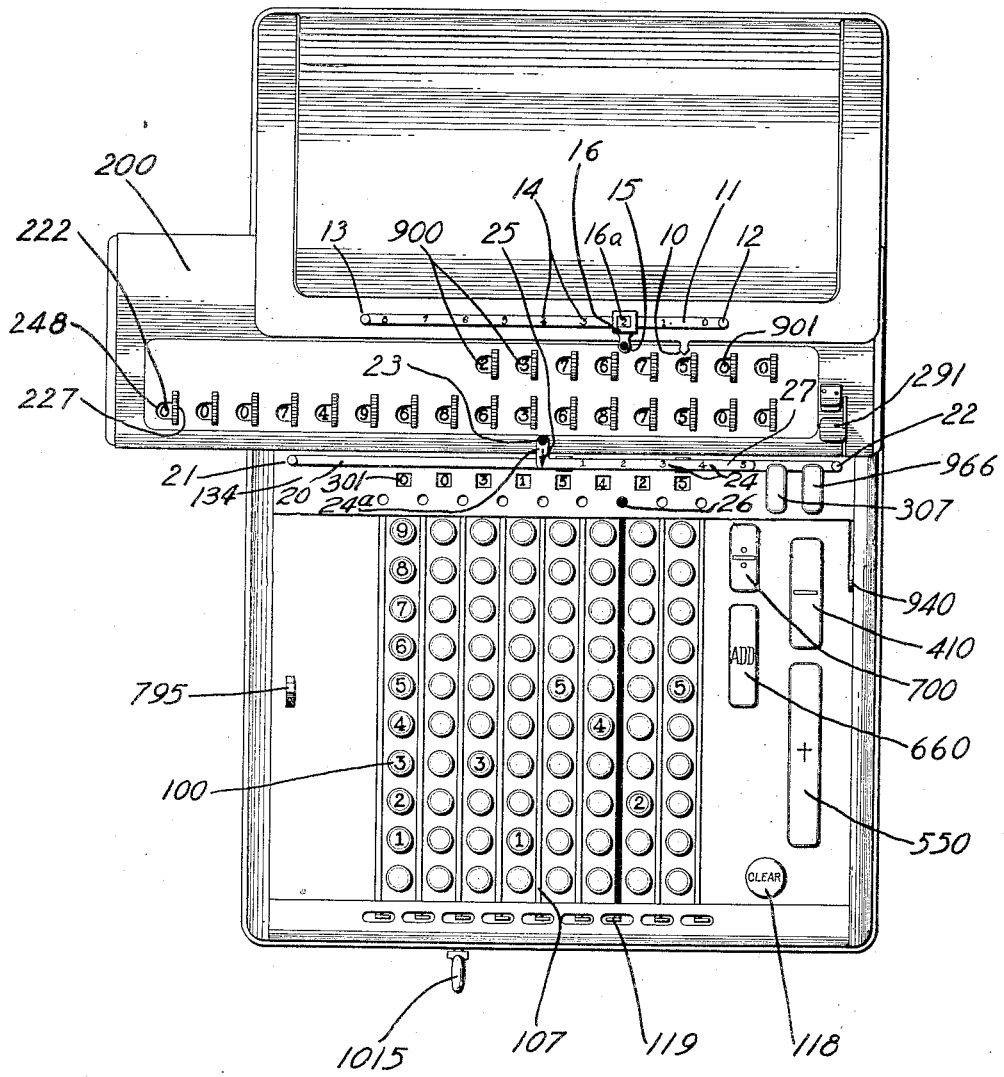

Sept. 14, 1943.　　　　　L. E. BOYD　　　　　2,329,180
DECIMAL POINT INDICATING MECHANISM
Filed April 18, 1939　　　3 Sheets-Sheet 1

FIG_1_

INVENTOR.
Lawrence E. Boyd
BY
ATTORNEY

Sept. 14, 1943.  L. E. BOYD  2,329,180

DECIMAL POINT INDICATING MECHANISM

Filed April 18, 1939  3 Sheets-Sheet 2

INVENTOR.
Lawrence E. Boyd
BY
ATTORNEY.

Sept. 14, 1943.   L. E. BOYD   2,329,180
DECIMAL POINT INDICATING MECHANISM
Filed April 18, 1939   3 Sheets-Sheet 3
FIG_6_
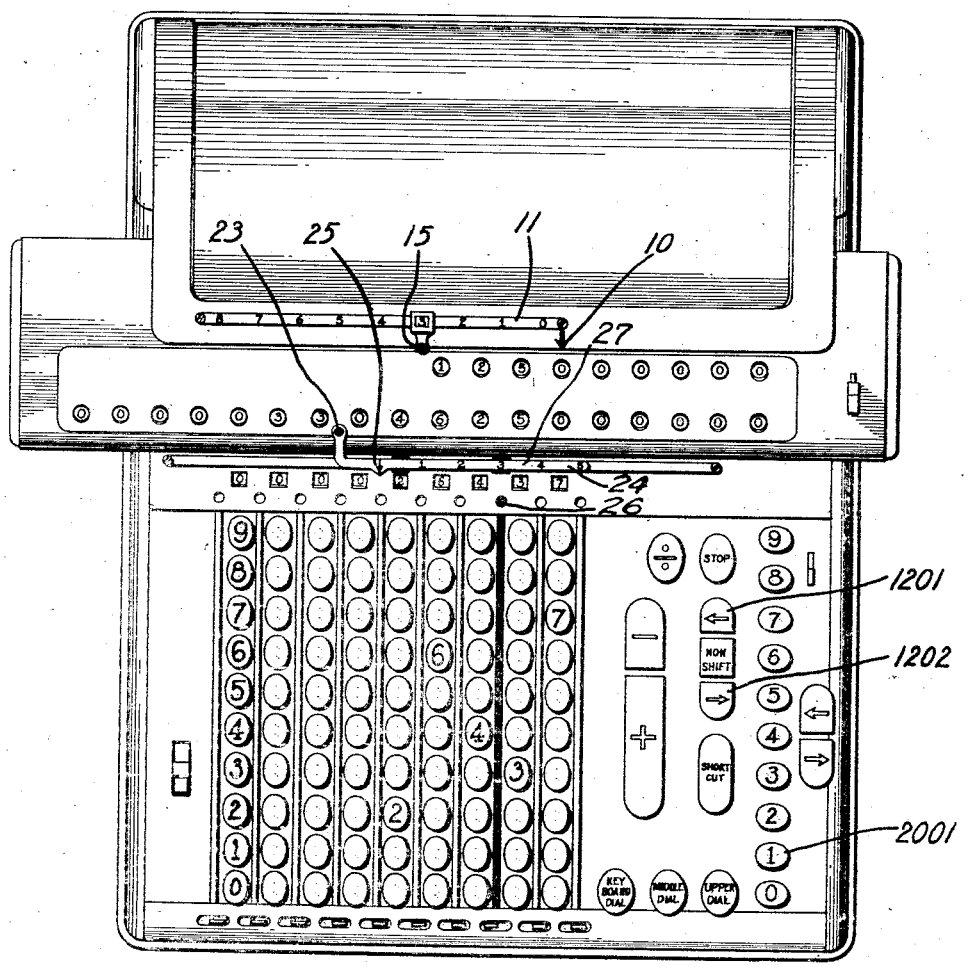
INVENTOR.
Lawrence E. Boyd
BY
ATTORNEY.

Patented Sept. 14, 1943

2,329,180

UNITED STATES PATENT OFFICE 2,329,180

DECIMAL POINT INDICATING MECHANISM

Lawrence E. Boyd, Nutley, N. J., assignor to Marchant Calculating Machine Company, a corporation of California Application April 18, 1939, Serial No. 268,510

14 Claims. (Cl. 235—63)

The present invention relates to decimal indicating devices for calculating machines, accounting machines, or the like, and particularly concerns decimal indicators which may be pre-set in accordance with given multiplication factor decimal points, by means of which the product decimal point is automatically adjusted to the correct decimal place in the product. The particular embodiments are shown as adapted to the commercially known Marchant calculating machine, models D and M, the operations of which are disclosed in detail in the Avery Patents No. 2,229,630 issued January 28, 1941 and No. 2,271,240 issued January 27, 1942, respectively. Although the commercial models differ in some details from those shown in said patents, the operations are fundamentally the same, and for the purpose of the present description, constructional details are immaterial since the invention may be readily adapted to any calculating machine in which the registering means for one or more factors is shiftable with respect to the registering means for the other, or others.

In calculating machines of this general class it has been possible to make a single setting of the several decimal point indicators serve for a series of multiplications only by taking care to position the carriage at the commencement of each computation so that the factor entered in the multiplier register appears in proper relationship to the pre-set decimal point indicator. Under such circumstances, resetting of all of the decimal point indicators is necessary when computations are encountered in which more multiplier digits appear before or after the decimal point than there are multiplier register dials to the left or right of the pre-set decimal point indicator, and in beginning every computation the operator must bring the carriage to a different starting position if the number of multiplier digits before or after the decimal point (depending upon the direction in which the carriage is to be shifted during calculation) is different from the number in the preceding computation.

The present invention provides improved decimal indicating devices which relieve the operator of the necessity of determining where the carriage should be placed at the beginning of each computation, and which do not need to be reset under the circumstances outlined above. Using a machine equipped with devices embodying the present invention, the operator needs only to move the carriage to its rightmost, or any other predetermined position, at the beginning of each computation. The position of the decimal point in the computed product will be correctly indicated under all circumstances.

It is therefore the principal object of the invention to provide decimal indicating means to cooperate with given factor decimal point positions to automatically establish the correct product decimal point position independently of the position of the carriage when starting multiplication, as well as of the size of the multiplier factor, and of the position of the decimal point therein. Other objects will appear in the following detailed description of preferred forms of the invention, reference being made to the accompanying drawings forming a part of this specification:

Figure 1 is a plan view of a Marchant calculating machine showing the decimal indicating devices;

Figures 2 to 5, inclusive, are diagrammatic illustrations showing the setting of the decimal indicating devices of the present invention in exemplary problems explained hereinafter; and Figure 6 is a plan view of a modification shown as adapted to a second type of Marchant calculating machine.

Multiplication is performed on the machine shown in Figure 1 as described in detail in the aforesaid Avery Patent No. 2,229,630 by setting the multiplicand factor in the keyboard by means of numeral keys 100, whereupon the registration appears in the keyboard dials 301. The carriage 200 is usually shifted to the extreme rightward position where the carriage position indicator 10 is aligned with the leftmost multiplier register dial 900.

The multiplier factor is entered by depressing the plus bar 550 whereupon the machine begins to operate, and adds the multiplicand into the product register dials 222 once for each cycle of the machine, with the registration in the left multiplier register dial 900 concurrently advancing one digit each cycle. The operator, in the case of the example 3154.25 times 2376.75, releases bar 550 when the figure 2, which is the first digit of the multiplier factor, appears in the leftmost dial 900, and then shifts the carriage 200 one ordinal position to the left by pressing shift lever 1015 to the left once. The key 550 is again depressed and held in depressed position until 3, which is the second digit of the multiplier factor, appears in the second multiplier dial 900 from the extreme left, when the operator again shifts the carriage and operates the machine repeatedly in the manner described until 7, 6, 7, and 5 appear in the following dials as shown, and the resulting product is displayed in the product register dials 222.

Since, as is well known, the number of digits following the decimal point in any product will be equal to the sum of the number of digits following the decimal points in both the multiplier and the multiplicand, it has been the practice in using machines such as those disclosed in the above mentioned patent applications, to set the multiplier and multiplicand decimal point indicators and then set the product decimal point indicator so that the number of dials to the right thereof equals the number of dials to the right of the multiplier decimal point indicator, plus the number of dials or keyboard rows to the right of the multiplicand decimal point indicator.

The present invention provides a product decimal point indicating means comprising a device 27 slidably mounted on a bar 20 secured to the frame of the machine by means such as screws 21 and 22, and preferably provided with an angular extension 24a on which a decimal point 23 is delineated which is adapted to be read with reference to the product register dials 222 but is not movable with the carriage 200 in its transverse shifts during calculation. In using this device in its simplest form, it is necessary only to set the multiplicand decimal point indicator 26 by means of the member 119 as described in detail in the above mentioned patents, and then to adjust the product decimal point indicating device 27 denominationally with respect to indicator 26 so that the number of multiplicand dials 301 and rows of keys 100 between the decimal point 23 or the setting indicium shown as an arrow 25 and the indicator 26 is equal to the number of digits following the decimal point in each multiplier factor which will be used.

The invention may be practically embodied in this simple form where the number of digits following the decimal point in each of a series of multipliers is the same.

In connection with the simple form of the device of the present invention thus far described, it is desirable to provide means for indicating the position of the decimal point in the multiplier factor of each problem, and indicia associated therewith, and with the product and multiplicand decimal indicators, which will aid in effecting the proper settings.

For this purpose, as shown in Figure 1, a bar 11 is mounted on the stationary part of the machine by means of screws 12 and 13, and is provided with progressive indicia 14 illustrated as numerals 1 to 8 delineated thereon at intervals equal to the distance between the dials 900, but preferably interspersed between the positions occupied by said dials when the carriage is in an operating position. Slidably mounted on the bar 11 is a multiplier decimal point indicating device 16, preferably provided with an extension on which a decimal point 15 is delineated which is adapted to be read with reference to the multiplier register dials 900, and also provided with a window 16a through which the underlying indicia 14 may be read. The product decimal indicating device 27 is, when designed for use with the multiplier decimal point indicating device just described, provided with progressive indicia 24, illustrated as numerals 1 to 5, inclusive, delineated along the body of the slidable device 27 at intervals equal to the distance between decimal orders of the keyboard 100 or multiplicand dials 301 of the machine.

The use of this preferred form of device is best shown by a series of multiplications set forth below, in which the factors vary, both in the number of digits, and the position of the decimal point, and which have been selected as examples in order to illustrate the flexibility of the device of the present invention:

$$3154.25 \times 2376.75 = 7496863.6875$$
$$3154.25 \times 6.75 = 21291.1875$$
$$3154.25 \times 76.75 = 242088.6875$$
$$327.24 \times 324. = 106025.76$$
$$28.13 \times 71.326 = 2006.40038$$

Performing the first problem, the operator, observing that there are two digits after the decimal point in the first multiplier factor, should set the multiplier decimal point indicating device 16 so that said number 2 appears in the window 16a. The multicand decimal point indicator 26 is then set by means of member 119, as described in the aforesaid applications, and the indicium on device 27 corresponding to that appearing in window 16a, in this case "2," is finally set in line with the multiplicand decimal point indicator 26 which has been so set.

It will be seen, upon reference to Figure 1 in which the indicating devices have been so set, and the first of the above problems has been performed, that the indicia 24 on bar 27 are so positioned as to cause the decimal point 23 to be spaced leftward of the indicator 26 so that the number of multiplicand dials 301 and rows of keys 100 between decimal point 23 and indicator 26 is indicated by the indicium in line with indicator 26. Since this indicium was selected to correspond to the indicium on bar 11 framed by window 16a, indicating the number of digits following the decimal point in the multiplier, it is apparent that the same positioning of the product decimal point indicator has been accomplished as was specified in the preceding description of the simplified form of the device. However, no counting of key rows or dials was required when the indicia were used, and an indication of the position of the multiplier decimal point was also provided.

The correct indication of the positions of the multiplicand, multiplier, and product decimal points at the conclusion of the computation of the first of the above examples of problems, is also shown in Figure 1.

Figure 2:
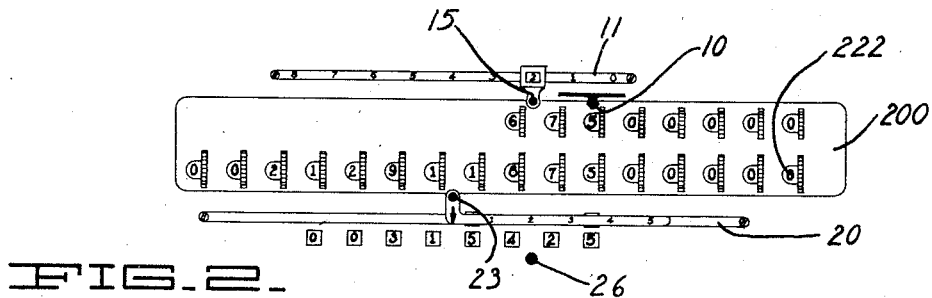
Figure 3:
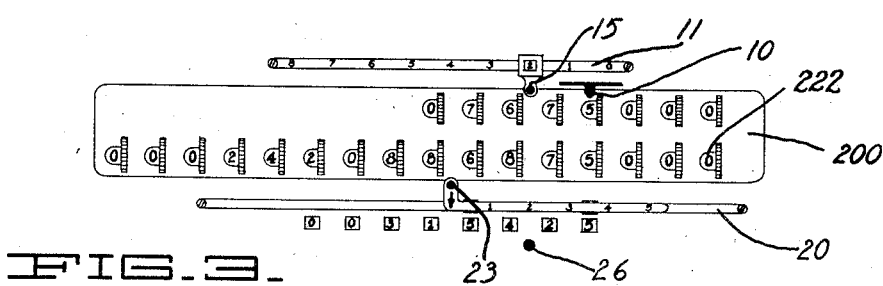
Figure 4:
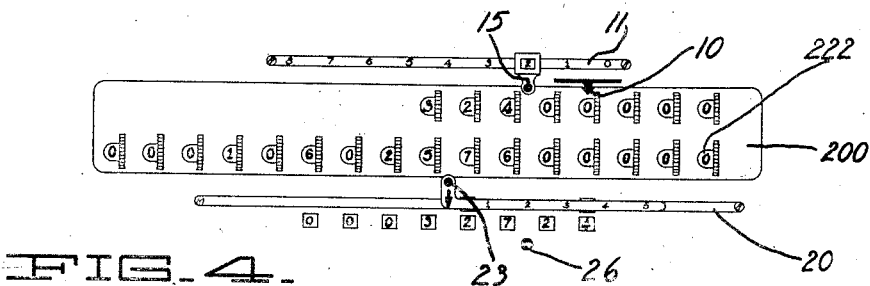

The second example is illustrated diagrammatically in Figure 2, in which the decimal indicating devices are left just as they were initially adjusted in connection with the preceding problem, and are shown positioned with respect to the carriage 200 as they are at the conclusion of the multiplication. In this case the carriage was shifted only two times, and since there is only one digit "6" before the decimal point in the multiplier, the indicator 16 rests in the correct position and the product decimal point 23 lies two places to the left of indicator 26, giving a correct total of four decimal places in the product.

In the first two examples the multiplication was started with the carriage in the extreme rightward position. This is not necessary, as will be seen by the third example shown in Figure 3.

Assume that the carriage lies one ordinal position to the left of its extreme rightward position. The multiplication may be started there or even one or two places still further to the left, for, since the relation of indicator 16 to indicator 27 is fixed, it does not matter in which order the multiplication commences, so long as the operator starts with the carriage far enough to the right to allow the required number of carriage shifts. It should be noted that the original setting of the decimal indicating devices has not had to be changed to perform any of these problems.

In all of the examples so far, the number of digits after the multiplier decimal has been constant. Therefore, the fourth example, illustrated in Figure 4, has been chosen to illustrate a multiplication by a multiplier having no digits after the decimal point.

After the operator multiplies by 3, 2, and 4, the machine actuations are completed and the correct product appears in the dials except for the position of the decimal point. It may be seen from the foregoing that at this time the multiplier decimal point 15 lies between the 3 and 2 digits of the multiplier, and the decimal product point 23 lies between the 0 and 2 of the product. From the given position of the decimal point in the multiplier in the fourth example, the operator immediately observes that the carriage need only be shifted two positions to the left to the position shown in Figure 4 in order to show the decimal point 15 in the given position relative to the digits in the multiplier register. He then presses the shift lever 1015 twice to the left, and the digits of both the multiplier and product registers come into correct position with respect to the decimal points.

Figure 5:
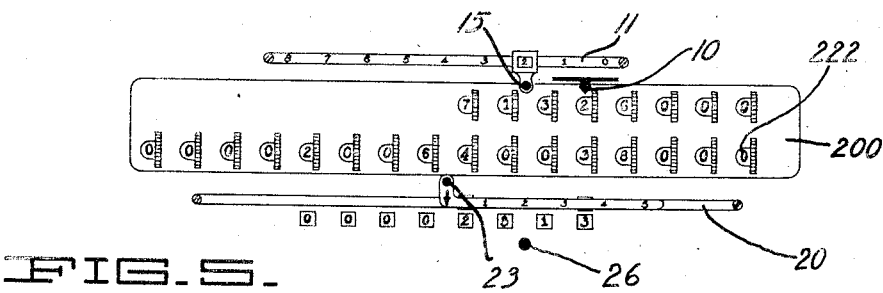

The fifth example, shown in Figure 5, is chosen to illustrate a problem in which the multiplier factor has three significant digits after the multiplier decimal.

After the operator consecutively multiplies by each digit, the carriage position indicator 10 is in alignment with the last digit "6" of the multiplier factor. From the position of the multiplier decimal point given in the problem, the operator observes that he needs only to shift the carriage one ordinal position to the right in order to show the multiplier decimal point in its correct position. He then presses the shift lever 1015 once to the right, whereupon the decimal point 15 appears in the position shown in Figure 5, and concurrently the product decimal point 23 is correctly positioned with respect to dials 222.

In the five examples shown, it will be noted that various types of possible multiplication operations are illustrated, and that during this series of multiplications only three extra machine operations were required in addition to the required multiplication operations, in order to position the product decimal point 23.

Modified embodiment

Either the simple or the preferred form of the present invention may easily be adapted to machines of the type shown in Figure 6, in which multiplication is performed automatically by consecutively depressing the multiplier keys 2001, representative of the digits of the multiplier factor. As explained in said Avery Patent No. 2,271,240, the depression of such a key, for example the number "4" key 2001, effects four cycles of actuation, and subsequently effects engagement of the shift clutch for one ordinal carriage shift in a direction determined by the key 1201 or 1202 preset. For example, 264.37 times .125, shown in Figure 6, the key 1201 is pre-set so that upon depression of the number 1, 2, and 5 keys 2001, the carriage shifts one ordinal position to the left after multiplication by each digit, with the carriage coming to rest in the position shown, after the calculation is completed. To compensate for this extra carriage shift after multiplication by the last digit "5," the product decimal point 23, instead of being in alignment with the setting indicium 25, is denominationally spaced one ordinal position to the left thereof. The bar 11 on which the multiplier decimal indicating device 16 is slidably mounted, in the preferred form of the invention, is also positioned one order to the left of the position in which it is shown in Figure 1, so that the zero is immediately to the left of the carriage position indicator 10, instead of to the right thereof, as shown in Figure 1. Otherwise, the decimal indicating devices are the same as disclosed in the first embodiment.

Upon viewing Figure 6, it may be seen that the operator has pre-set the multiplier decimal point indicating device 16 to the number "3" position, since there are three digits to the right of the multiplier decimal point and he has correspondingly set the "3" indicium on product decimal indicating device 27 in line with the keyboard decimal point indicator 26, whereupon the product decimal point is correctly positioned after the calculation is completed.

This type of machine affords more convenient means for compensating for deviations from the three decimals provided for in this problem. Assume, for instance, that the next multiplier is 12.5. The decimal indicating devices may be left where set, and it will immediately appear to the operator of such a machine that he needs only to depress the zero key 2001 twice, which will move the carriage to the position where the decimal point 15 lies between the 2 and 5, and the product will be correctly pointed off at 3304.625.

Many other examples could be given to show the flexibility of the invention, and since other modifications will appear at once to those skilled in the art, the invention is not to be considered as confined to the embodiments shown and described.

I claim:

1. A decimal indicating device for a calculating machine having denominationally arranged selecting mechanism upon which an amount may be set, including denominationally arranged means for indicating the amount set thereon; adjustable decimal indicating means associated with said amount indicating means, and a register denominationally shiftable with respect to said indicating means; comprising a decimal indicator attached to a portion of the machine with respect to which said register is shiftable, extending into decimal indicating relationship with said register, and denominationally adjustable with respect to the decimal indicating means associated with said amount indicating means.

2. A decimal indicating device for a calculating machine having denominationally arranged selecting mechanism upon which an amount may be set, including denominationally arranged means for indicating the amount set thereon; adjustable decimal indicating means associated with said amount indicating means, and a register denominationally shiftable with respect to said indicating means; comprising a decimal indicator attached to a portion of the machine with respect to which said register is shiftable, said indicator having a decimal indicating portion disposed in decimal indicating relationship with said register and a setting indicium denominationally spaced from said decimal indicating portion, and being denominationally adjustable with respect to the decimal indicating means associated with said amount indicating means.

3. Decimal indicating means for a calculating machine having denominationally arranged selecting mechanism upon which an amount may be set, including denominationally arranged means for indicating the amount set thereon; adjustable decimal indicating means associated with said amount indicating means, a product register denominationally shiftable with respect to said amount indicating means, and a multiplier register; comprising a product decimal indicator mounted upon a portion of the machine with respect to which said product register is shiftable, said indicator having a decimal indicating portion disposed in decimal indicating relationship with said product register, and being denominationally adjustable with respect to the decimal indicating means associated with said amount indicating means; and adjustable decimal indicator means having a portion disposed in decimal indicating relationship with said multiplier register and having a portion for indicating, for any given adjustment of said indicator means, the proper denominational adjustment of said product decimal indicator with respect to the decimal indicating means associated with said amount indicating means.

4. Decimal indicating means for a calculating machine having denominationally arranged selecting mechanism upon which an amount may be set, including denominationally arranged means for indicating the amount set thereon; adjustable decimal indicating means associated with said amount indicating means, a product register denominationally shiftable with respect to said amount indicating means, and a multiplier register; comprising a product decimal indicator mounted upon a portion of the machine with respect to which said product register is shiftable, said indicator having a decimal indicating portion disposed in decimal indicating relationship with said product register, and a setting indicium denominationally spaced from said decimal indicating portion, and being denominationally adjustable with respect to the decimal indicating means associated with said amount indicating means; and adjustable decimal indicator means having a portion disposed in decimal indicating relationship with said multiplier register and having a portion for indicating, for any given adjustment of said indicator means, the proper denominational adjustment of the setting indicium of said product decimal indicator with respect to the decimal indicating means associated with said amount indicating means.

5. Decimal indicating devices for a calculating machine having denominationally arranged selecting mechanism upon which an amount may be set, including denominationally arranged means for indicating the amount set thereon; adjustable decimal indicating means associated with said amount indicating means, a product register denominationally shiftable with respect to said indicating means, and a multiplier register; comprising a product decimal indicator mounted upon a portion of the machine with respect to which said product register is shiftable, said indicator having a decimal indicating portion disposed in decimal indicating relationship with said product register and progressively distinguished setting indicia denominationally spaced from said decimal indicating portion, and being denominationally adjustable with respect to the decimal indicating means associated with said amount indicating means; and adjustable decimal indicator means having a portion disposed in decimal indicating relationship with said multiplier register and having a portion for indicating, for any given adjustment of said indicator means, the proper denominational adjustment of the aforesaid progressively distinguished indicia with respect to the decimal indicating means associated with said amount indicating means.

6. A decimal indicating device for a calculating machine having denominationally arranged selecting mechanism upon which an amount may be set, including denominationally arranged means for indicating the amount set thereon; adjustable decimal indicating means associated with said amount indicating means, and a register denominationally shiftable with respect to said indicating means; comprising means for indicating the location of the decimal point in an amount displayed by said register including a member attached to a part of the machine with respect to which said register is shiftable and a pointer disposed in decimal indicating relationship with said register denominationally adjustable with respect thereto and with respect to the decimal indicating means associated with said amount indicating means.

7. Decimal indicating devices for a calculating machine having a plurality of series of denominationally arranged means for displaying factors of a computation and a denominational register for displaying the result thereof; comprising decimal indicating means settable to indicate the position of the decimal point in amounts entered in one series of said factor displaying means, a decimal indicator disposed in decimal indicating relationship with said result register and denominationally adjustable with respect to said decimal indicating means, and a scale provided with progressive indicia disposed between said decimal indicating means and said decimal indicator, to indicate the position of the decimal point in an amount entered in the other series of said factor displaying means, for any given setting of said decimal indicator with respect to said decimal indicating means.

8. A decimal indicating device for a calculating machine having a plurality of series of denominationally arranged means for displaying factors of a computation and a denominational register for displaying the result thereof; comprising a decimal indicator denominationally adjustable with respect to said register and provided with a scale of denominationally spaced indicia movable, upon such adjustment of said indicator, into alignment with selected positions of the decimal point in one of said series of factor displaying means.

9. A decimal indicating device for a calculating machine having a plurality of series of denominationally arranged means for displaying factors and results of computations; comprising a decimal indicator disposed in decimal indicating relationship with one of said series and denominationally adjustable with respect thereto; said indicator being provided with a scale of denominationally spaced indicia movable upon such adjustment of said indicator, into alignment with selected positions of the decimal point in another of said series.

10. A decimal indicator for a calculating machine having a series of means for displaying a factor of a computation and a denominational register mounted on a carriage denominationally shiftable with respect to said series of means, for displaying the result of a computation; comprising a decimal indicator means for indicating the position of the decimal point in an amount displayed by said register, manually adjustable denominationally of said register in accordance with any selected position of the decimal point in said series of factor displaying means, in combination with means automatically effective upon shifting of said carriage for effecting relative denominational adjustment of said indicator and said register.

11. A decimal indicating device for a calculating machine having denominationally arranged selecting mechanism upon which an amount may be set, including denominationally arranged means for indicating the amount set thereon; and a register denominationally shiftable with respect to said indicating means; comprising decimal indicating mechanisms including decimal indicating means associated with said amount indicating means, and a decimal indicator attached to a portion of the machine with respect to which said register is shiftable, said indicator having a decimal indicating portion disposed in decimal indicating relationship with said register; and denominationally spaced setting indicia for said decimal indicator with respect to which one of said decimal indicating mechanisms is relatively adjustable denominationally.

12. Decimal indicating means for a calculating machine having denominationally arranged selecting mechanism upon which an amount may be set, including denominationally arranged means for indicating the amount set thereon; adjustable decimal indicating means associated with said amount indicating means, a product register denominationally shiftable with respect to said amount indicating means, and a multiplier register; comprising a product decimal indicator attached to a portion of the machine with respect to which said product register is shiftable, said indicator having a decimal indicating portion in decimal indicating relationship with said product register, and being denominationally adjustable with respect to the decimal indicating means associated with said amount indicating means; adjustable decimal indicator means having a portion disposed in decimal indicating relationship with said multiplier register, and scale means associated with said decimal indicator, with said decimal indicator means, and with said decimal indicating means, for indicating the proper adjustment of any one of said three last mentioned elements for any given adjustment of the other two thereof.

13. A decimal indicating device for a calculating machine having a series of denominationally arranged numeral wheels for displaying amounts, actuating mechanism for entering amounts into said numeral wheels, selection mechanism for setting said actuating mechanism, and shift mechanism operable after a value has been entered into said actuating mechanism and as an incident to a calculation for conditioning the actuating mechanism to control entry into denominationally selected numeral wheels; comprising a decimal point indicator means for indicating the position of the decimal point in an amount displayed by said numeral wheels; said indicator means being denominationally adjustable relative to said actuating mechanism, and means controlled by said shift mechanism upon operation as aforesaid for effecting relative denominational adjustment of said indicator means relative to said numeral wheels.

14. A decimal indicating device for a calculating machine having a series of denominationally arranged numeral wheels for displaying amounts, actuating mechanism for entering amounts into said numeral wheels, selection mechanism for setting said actuating mechanism, and automatic multiplication control mechanism; comprising a decimal point indicator means for indicating the position of the decimal point in an amount displayed by said numeral wheels; said indicator means being denominationally adjustable relative to said actuating mechanism, and means responsive to said automatic multiplication control mechanism upon operation thereof for effecting relative denominational adjustment of said indicator means relative to said numeral wheels and for effecting relative denominational adjustment of said actuating mechanism relative to said numeral wheels.

LAWRENCE E. BOYD.